US007899728B2

(12) United States Patent
Egan (10) Patent No.: US 7,899,728 B2
(45) Date of Patent: *Mar. 1, 2011

(54) SYSTEM AND METHOD FOR PROVIDING A MUTUAL FUND RATING PLATFORM

(76) Inventor: Sean J. Egan, Haverford, PA (US)

( * ) Notice: Subject to any disclaimer, the term of this patent is extended or adjusted under 35 U.S.C. 154(b) by 22 days.

This patent is subject to a terminal disclaimer.

(21) Appl. No.: 12/078,395

(22) Filed: Mar. 31, 2008

(65) Prior Publication Data

US 2008/0294570 A1    Nov. 27, 2008

Related U.S. Application Data

(60) Provisional application No. 60/931,627, filed on May 24, 2007.

(51) Int. Cl.
*G06Q 40/00* (2006.01)
*H04L 12/18* (2006.01)
(52) U.S. Cl. .......................... 705/36 R; 705/35
(58) Field of Classification Search ............ 705/36 R
See application file for complete search history.

(56) References Cited

U.S. PATENT DOCUMENTS

| 6,003,018 | A | 12/1999 | Michaud et al. |
|---|---|---|---|
| 6,336,103 | B1 | 1/2002 | Baker |
| 6,546,375 | B1 | 4/2003 | Pang et al. |
| 7,149,715 | B2 | 12/2006 | Browne et al. |
| 7,171,385 | B1 | 1/2007 | Dembo et al. |
| 2002/0046144 | A1 | 4/2002 | Graff |
| 2006/0190371 | A1 | 8/2006 | Almgren et al. |
| 2006/0242039 | A1 | 10/2006 | Haggerty et al. |
| 2006/0242046 | A1 | 10/2006 | Haggerty et al. |
| 2006/0242047 | A1 | 10/2006 | Haggerty et al. |
| 2006/0242048 | A1 | 10/2006 | Haggerty et al. |
| 2006/0242049 | A1 | 10/2006 | Haggerty et al. |
| 2006/0242050 | A1 | 10/2006 | Haggerty et al. |
| 2006/0242051 | A1 | 10/2006 | Haggerty et al. |
| 2007/0016500 | A1 | 1/2007 | Chatterji et al. |
| 2007/0016501 | A1 | 1/2007 | Chatterji et al. |
| 2007/0067206 | A1 | 3/2007 | Haggerty et al. |

(Continued)

OTHER PUBLICATIONS

Predicting Long-Term Stock Return Volatility: Implications for Accounting and Valuation of Equity Derivatives Author(s): Andrew W. Alford and James R. Boatsman Source: The Accounting Review, vol. 70, No. 4 (Oct. 1995), pp. 599-618 Published by: American Accounting Association Stable URL: http://www.jstor.org/stable/248249, las accessed: Jul. 6, 2010.*

(Continued)

*Primary Examiner* — Ella Colbert
*Assistant Examiner* — Daniel L Greene, Jr.
(74) *Attorney, Agent, or Firm* — Drinker Biddle & Reath LLP (57) ABSTRACT

A system and method are provided for assigning ratings (the "Ratings") on mutual funds and other investment funds (collectively the "Funds") based on various information gleaned from public and privately traded financial, currency, interest rate and other futures, along with options on said futures (collectively the "Futures"). In an illustrative implementation, the system can operate to combine information on the historical rates of return and variability in the rates of return of the Funds with the expected range of future returns for various asset classes as determined by the pricing of the Futures. Illustratively, the rating for the Funds (the "Rating") can incorporate the range of expected future returns, the variability of past returns, and the level of risk.

28 Claims, 5 Drawing Sheets

U.S. PATENT DOCUMENTS

| | | |
|---|---|---|
| 2007/0067207 A1 | 3/2007 | Haggerty et al. |
| 2007/0067208 A1 | 3/2007 | Haggerty et al. |
| 2007/0067209 A1 | 3/2007 | Haggerty et al. |
| 2007/0078741 A1 | 4/2007 | Haggerty et al. |

OTHER PUBLICATIONS

Macroeconomic Influences and the Variability of the Commodity Futures Basis Author(s): Warren Bailey and K. C. Chan Source: The Journal of Finance, vol. 48, No. 2 (Jun. 1993), pp. 555-573 Published by: Blackwell Publishing for the American Finance Association Stable URL: http://www.jstor.org/stable/2328912, last accessed: Jul. 6, 2010.*

Robert W. Kolb, "Options"—The Investor's Complete Tool Kit; 1991.

Int'l Search Report for PCT/US08/06515 dated Aug. 7, 2008.

Office Action mailed Sep. 16, 2009 in U.S. Appl. No. 10/010,102.

* cited by examiner

SYSTEM AND METHOD FOR PROVIDING A MUTUAL FUND RATING PLATFORM

This application claims benefit from Provisional U.S. Patent Application No. 60/931,627, filed May 24, 2007, the entire content of which is incorporated herein by reference.

BACKGROUND

Ratings of investment vehicles are one factor commonly used by investors and financial advisors in determining how to invest. These ratings are typically divided into various types of investments, such as funds with particular investment objectives or types of holdings. Ratings are generally based on past returns. However, investors and their financial advisors are seeking information about future performance, not past performance, of investment vehicles. As a result, existing ratings are limited in their usefulness.

Futures provide information on expected future returns in various investment areas or asset classes. For example, a financial future on the S&P 500 for the period ending June 2007 is a representation of what the financial markets expect the value of the S&P 500 will be in June 2007. Financial futures are now available for a number of segments of the market, such as US value stocks, US growth stocks, small capitalization stocks, large capitalization stocks, US Treasury Bonds, high yields bonds, etc. By combining information on the Funds with the expected range of future returns, as implied by the pricing of the Futures, one can derive a range of expected future returns, the volatility of future returns, and a rating, which reflects the expected return and the risk of the Fund.

Expanding on the example of the S&P 500 future and a large capitalization mutual fund, whereby the future indicated that the expected return was an annualized 7%. Using a modification of the Black-Scholes (a widely used option pricing equation developed in 1973 by Fisher Black and Myron Scholes used to price OTC options), one could determine that there was a 66% chance that the return would be within 5 and 9% and a 95% chance that the return would be within 4 and 10% for the period ending June 2007. If the Fund had a historic return that was on average 1% less than the S&P 500, but with the same level of volatility, then the mean expected return would be 6%, and the range of expected returns at the 66% level of confidence would be 4 to 8% (i.e., 1% less than the example with the S&P 500). In the same way, the range of returns at the 95% confidence level would be 3 to 9% (i.e., 1% less than the example with the S&P 500).

In assigning ratings, the expected future return and volatility of future return is compared to that of other investment classes. For example, if large capitalization funds were expected to return 7% with a 4% range at the 66% confidence level, compared to a South American equity fund with an expected return of 5% and a range of 4% at the 66% probability level, the South American sector would be less appealing and therefore have a weaker rating. Note, the relative returns of the Fund are incorporated into the expected future return for the sector in deriving ratings. The Rating represents the expected risk and reward.

Note, the Black-Scholes model is useful for pricing options, whereas futures pricing can be used to determine the expected future returns for various investment areas, and a combination of futures pricing information the relative performance of a fund and other information such as capability assessment of investment managers, support staff and characteristics of portfolio securities to derive a rating. With existing practices, firms can operate to rate Funds use mainly historical returns in assigning ratings.

From the foregoing it is appreciated that there exists a need for a new platform that ameliorates the shortcomings of existing practices.

SUMMARY

A system and method are provided for assigning ratings (the "Ratings") on mutual funds and other investment funds (collectively the "Funds") based on various information gleaned from public and privately traded financial, currency, interest rate and other futures, along with options on said futures (collectively the "Futures"). In an illustrative implementation, the system can operate to combine information on the historical rates of return and variability in the rates of return of the Funds with the expected range of future returns for various asset classes as determined by the pricing of the Futures. Illustratively, the rating for the Funds (the "Rating") can incorporate the range of expected future returns, the variability of past returns, and the level of risk.

In an illustrative operation, the exemplary system can perform a method comprising any of the following steps such as: calculating an expected return over a time period for a sector corresponding to the fund based on financial futures corresponding to the sector, calculating an expected range of returns for the sector based on prices of options for the futures, calculating an expected return for the fund over a time period based on the calculated expected return for the corresponding sector, the expected range of returns for the corresponding sector, and on information specific to the fund, and assigning a rating based on the expected return for the fund.

In the illustrative operation, one or more of a range of expected future returns, the volatility of future returns, and ratings (i.e., reflecting an expected return and risk of the fund) can be derived by combining information on the funds with an expected range of future returns, as implied by the pricing of the futures.

Other features of the herein described systems and methods are further described below.

BRIEF DESCRIPTION OF THE DRAWINGS

The methods and system for a mutual fund rating platform are further described with reference to the accompanying Figures in which.

DETAILED DESCRIPTION

Figure 1:
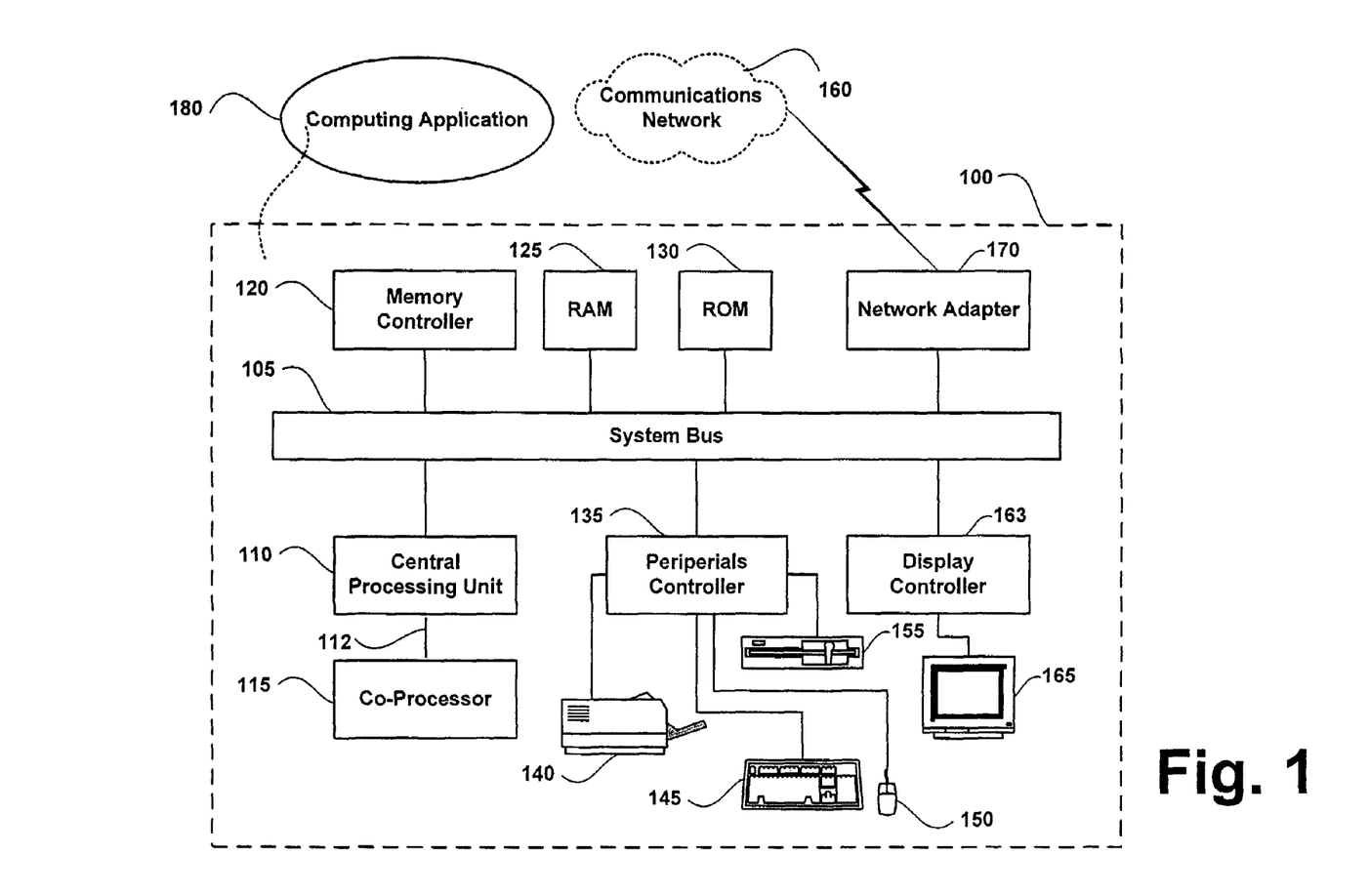
FIG. 1 is a block diagram of an exemplary computing environment in accordance with an implementation of the herein described systems and methods.

FIG. 1 depicts an exemplary computing system 100 in accordance with herein described system and methods. The computing system 100 is capable of executing a variety of computing applications 180. Computing application 180 can comprise a computing application, a computing applet, a computing program and other instruction set operative on computing system 100 to perform at least one function, operation, and/or procedure. Exemplary computing system 100 is controlled primarily by computer readable instructions, which may be in the form of software. The computer readable instructions can contain instructions for computing system 100 for storing and accessing the computer readable instructions themselves. Such software may be executed within central processing unit (CPU) 110 to cause the computing system 100 to do work. In many known computer servers, workstations and personal computers CPU 110 is implemented by micro-electronic chips CPUs called microprocessors. A coprocessor 115 is an optional processor, distinct from the main CPU 110 that performs additional functions or assists the CPU 110. The CPU 110 may be connected to co-processor 115 through interconnect 112. One common type of coprocessor is the floating-point coprocessor, also called a numeric or math coprocessor, which is designed to perform numeric calculations faster and better than the general-purpose CPU 110.

In operation, the CPU 110 fetches, decodes, and executes instructions, and transfers information to and from other resources, such as via the computer's main data-transfer path, system bus 105, or via other wired or wireless data paths, such as a LAN, WAN, or the Internet. Such a system bus connects the components in the computing system 100 and defines the medium for data exchange. Memory devices coupled to the system bus 105 include random access memory (RAM) 125 and read only memory (ROM) 130. Such memories include circuitry that allows information to be stored and retrieved. The ROMs 130 generally contain stored data that cannot be modified. Data stored in the RAM 125 can be read or changed by CPU 110 or other hardware devices. Access to the RAM 125 and/or ROM 130 may be controlled by memory controller 120. The memory controller 120 may provide an address translation function that translates virtual addresses into physical addresses as instructions are executed.

In addition, the computing system 100 can contain peripherals controller 135 responsible for communicating instructions from the CPU 110 to peripherals, such as, printer 140, keyboard 145, mouse 150, and data storage drive 155. Display 165, which is controlled by a display controller 163, is used to display visual output generated by the computing system 100. Such visual output may include text, graphics, animated graphics, and video. The display controller 163 includes electronic components required to generate a video signal that is sent to display 165. Further, the computing system 100 can contain network adaptor 170 which may be used to connect the computing system 100 to an external communication network 160.

Figure 2:
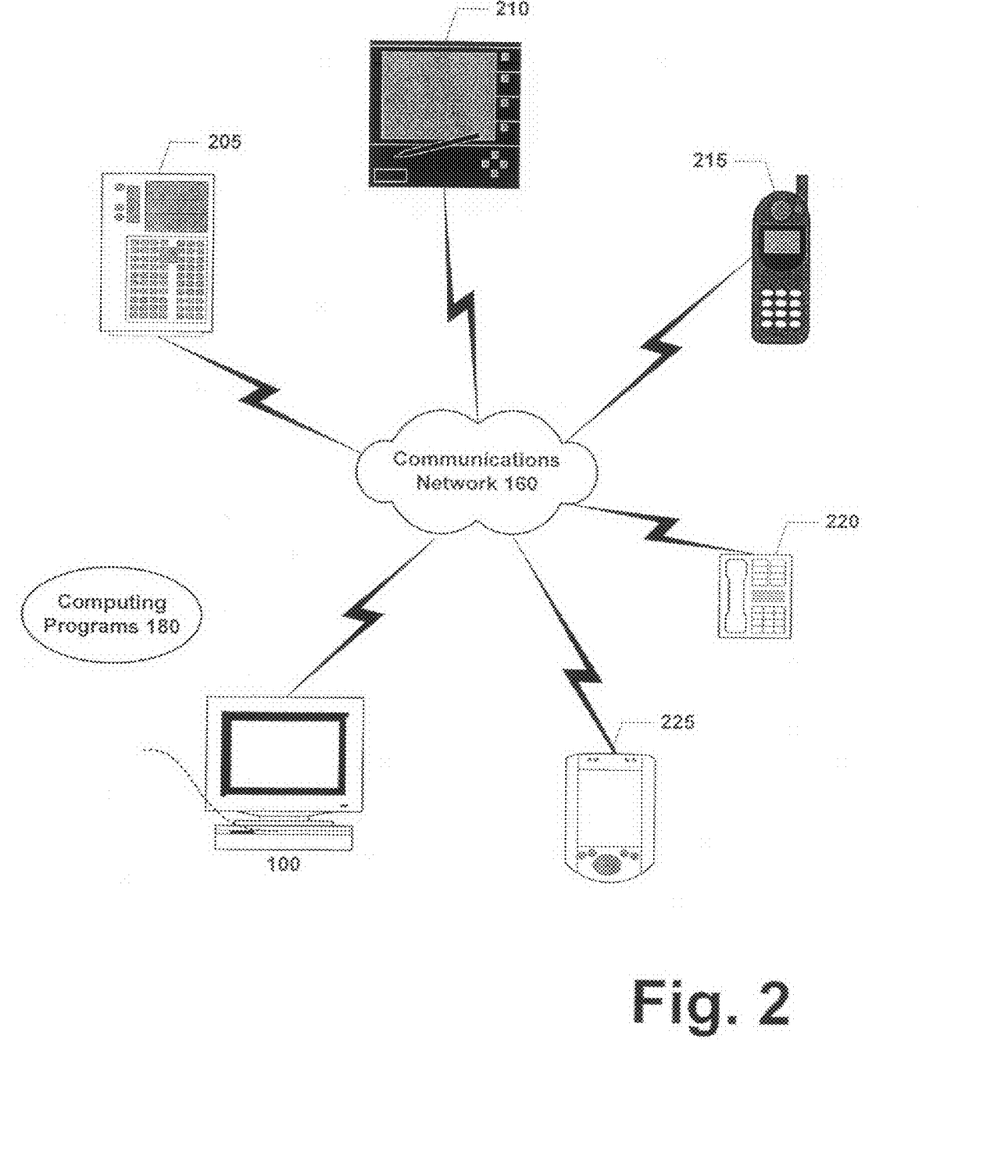
FIG. 2 is a block diagram showing the cooperation of exemplary components of an illustrative implementation in accordance with the herein described systems and methods.

Illustrative Computer Network Environment:

Computing system 100, described above, can be deployed as part of a computer network. In general, the above description for computing environments applies to both server computers and client computers deployed in a network environment. FIG. 2 illustrates an exemplary illustrative networked computing environment 200, with a server in communication with client computers via a communications network, in which the herein described apparatus and methods may be employed. As shown in FIG. 2, server 205 may be interconnected via a communications network 160 (which may be either of, or a combination of a fixed-wire or wireless LAN, WAN, intranet, extranet, peer-to-peer network, virtual private network, the Internet, or other communications network) with a number of client computing environments such as tablet personal computer 210, mobile telephone 215, telephone 220, personal computer 100, and/or personal digital assistant 225. In a network environment in which the communications network 160 is the Internet, for example, server 205 can be dedicated computing environment servers operable to process and communicate data to and from client computing environments 100, 210, 215, 220, and 225 via any of a number of known protocols, such as, hypertext transfer protocol (HTTP), file transfer protocol (FTP), simple object access protocol (SOAP), or wireless application protocol (WAP). Additionally, networked computing environment 200 can utilize various data security protocols such as secured socket layer (SSL) or pretty good privacy (PGP). Each client computing environment 100, 210, 215, 220, and 225 can be equipped with operating system 180 operable to support one or more computing applications, such as a web browser (not shown), or other graphical user interface (not shown), or a mobile desktop environment (not shown) to gain access to server computing environment 205.

In operation, a user (not shown) may interact with a computing application running on a client computing environment to obtain desired data and/or computing applications. The data and/or computing applications may be stored on server computing environment 205 and communicated to cooperating users through client computing environments 100, 210, 215, 220, and 225, over exemplary communications network 160. A participating user may request access to specific data and applications housed in whole or in part on server computing environment 205. These data may be communicated between client computing environments 100, 210, 215, 220, and 220 and server computing environments for processing and storage. Server computing environment 205 may host computing applications, processes and applets for the generation, authentication, encryption, and communication data and applications and may cooperate with other server computing environments (not shown), third party service providers (not shown), network attached storage (NAS) and storage area networks (SAN) to realize application/data transactions.

Mutual Fund Ratings:

Overview:

The herein described system and methods illustratively employs financial futures in ranking or assessing various investments. Financial futures provide information on expected future returns in various investment areas or asset classes. For example, a financial future on the S&P 500 for the period ending June 2007 is a representation of what the financial markets expect the value of the S&P 500 will be in June 2007. Financial futures are now available for a number of segments of the market, such as US value stocks, US growth stocks, small capitalization stocks, large capitalization stocks, US Treasury Bonds, high yield bonds, and other categories.

It is possible to use known mathematical techniques in order to determine expected future returns for various investment vehicles, and in particular actual and virtual funds that comprise a number of securities. Actual funds include traditional mutual funds. Virtual funds include folios, which are collections of individual securities that are assembled by investors or made available from brokerages. These funds may include conventional mutual finds, which hold a variety of securities, or virtual funds, in which investors directly buy and sell securities as they choose or as directed by a manager. In the method of the herein described system and methods, employing information on the classification of the funds, past performance of the funds, performance of the asset classes to which the funds belong, and futures for the asset classes to which the funds belong, a prediction for future performance can be obtained. The prediction can then be utilized as a rating.

By way of example, future earnings for a large capitalization mutual fund will be explained. For a large capitalization mutual fund, a suitable future would be the S&P 500 future, large capitalization mutual fund, if the future indicated that the expected return was an annualized 7%. Using a modification of the Black-Scholes (a widely used option pricing equation developed in 1973 by Fisher Black and Myron Scholes used to price OTC options), one could determine that there was a 66% chance that the return would be within 5 and 9% and a 95% chance that the return would be within 4 and 10% for the period ending June 2007. If the Fund had a historic return that was on average 1% less than the S&P 500, but with the same level of volatility, then the mean expected return would be 6%, and the range of expected returns at the 66% level of confidence would be 4 to 8% (i.e., 1% less than the example with the S&P 500). In the same way, the range of returns at the 95% confidence level would be 3 to 9% (i.e., 1% less than the example with the S&P 500).

In assigning ratings, the expected future return and volatility of future return is compared to that of other investment classes. For example, if large capitalization funds were expected to return 7% with a 4% range at the 66% confidence level, compared to a South American equity fund with an expected return of 5% and a range of 4% at the 66% probability level, the South American sector would be less appealing and therefore have a weaker rating. Note, the relative returns of the fund are incorporated into the expected future return for the sector in deriving ratings. The rating represents the expected risk and reward.

Note, the Black-Scholes model is useful for pricing options, whereas the method of the present herein described system and methods uses futures pricing to determine the expected future returns for various investment areas, and combining that information with the relative performance of a fund and other information such as an assessment of the capability of the investment managers, support staff and characteristics of portfolio securities to derive a rating.

Figure 3:
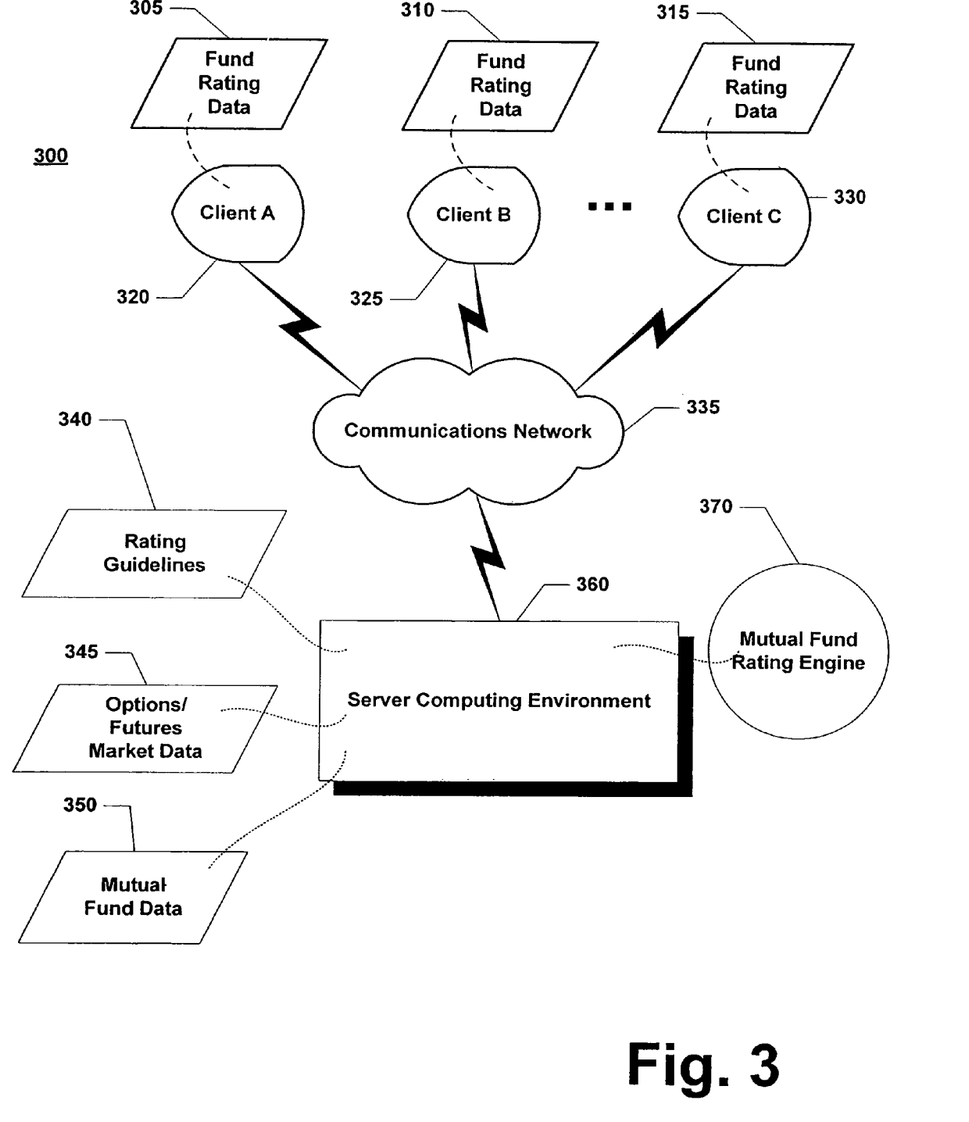
FIG. 3 is a block diagram showing the cooperation of exemplary components of an illustrative implementation of a facility and power management, monitoring, and metric processing platform for building operations in accordance with the herein described systems and methods.

FIG. 3 shows an illustrative implementation of an exemplary mutual fund rating environment 300. As is shown in FIG. 3, mutual fund rating environment comprises a plurality of client computing environments 320, 325, and 330 operatively cooperating with server computing environment 360 over communications network 335. Further, client computing environments 320, 325, and 330 are operative to display, navigate, manage, store, and receive input for data 305, 310, and 315, respectively, representative of fund ratings. As is shown, server computing environment can illustratively execute mutual fund rating engine and cooperate with various data stores to process various data including but not limited to rating guidelines 340, options/futures market data 345, and mutual fund data 350.

In an illustrative operation, one or more client computing environments 320, 325, and/or 330 can request mutual fund rating data from server computing environment 360 by sending a request over communications network 335. Responsive to the request, server computing environment 360 can cooperate with mutual fund rating engine to process the request using one or more data/instruction sources including but not limited to rating guidelines data store 340, options/futures market data store 345, and/or mutual fund data store 350 to generate rating data. Illustratively, the generated rating data 305, 310, and/or 315 can then be communicated to the one or more requesting client computing environment 320, 325, and/or 330 for subsequent use (e.g., display, navigation, storage, management, communication etc.).

Figure 4A:
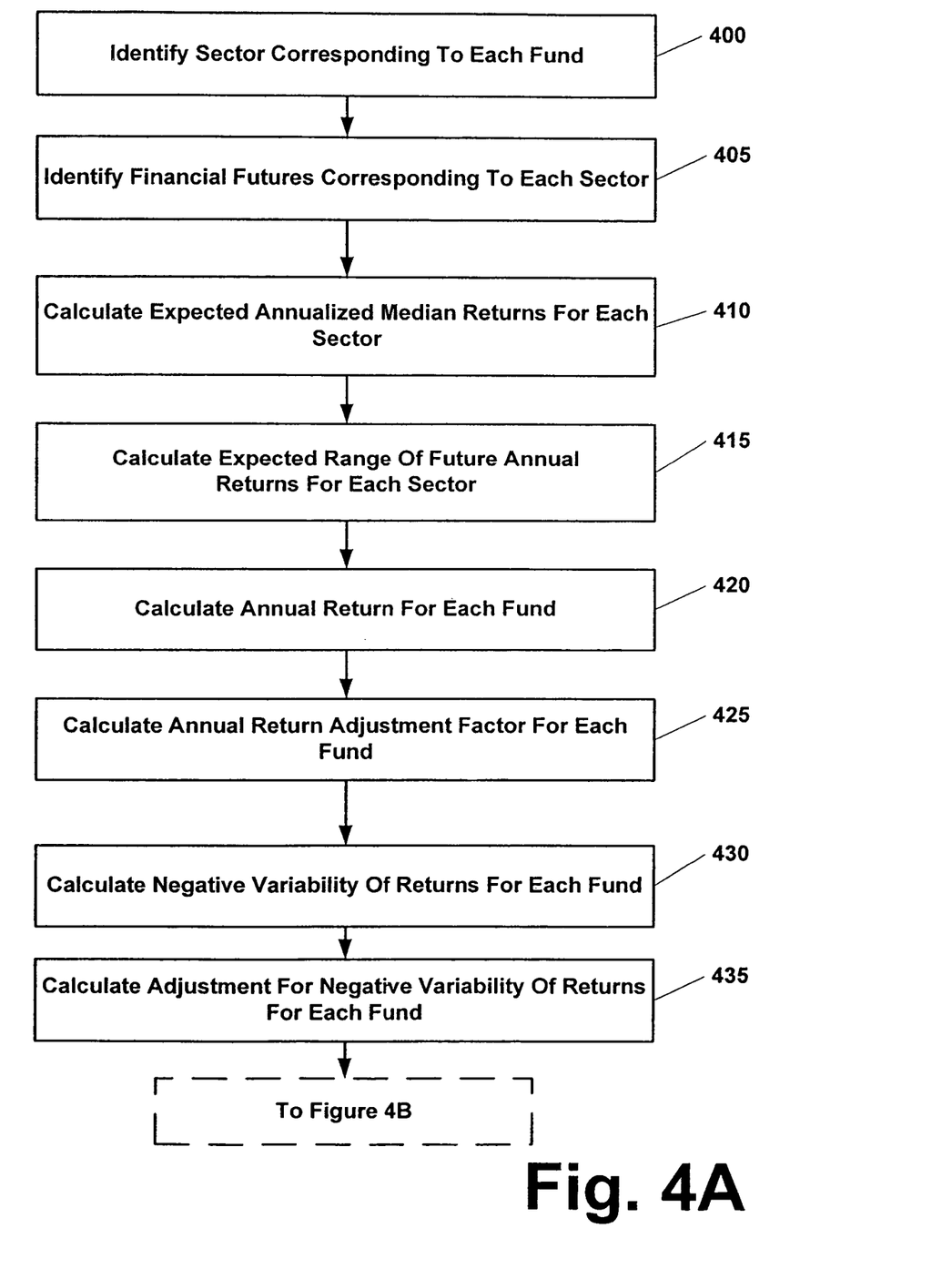
FIGS. 4A-4B are flow diagrams describing exemplary processing performed in connection with rating a mutual fund in accordance with the herein described systems and methods.
Figure 4B:
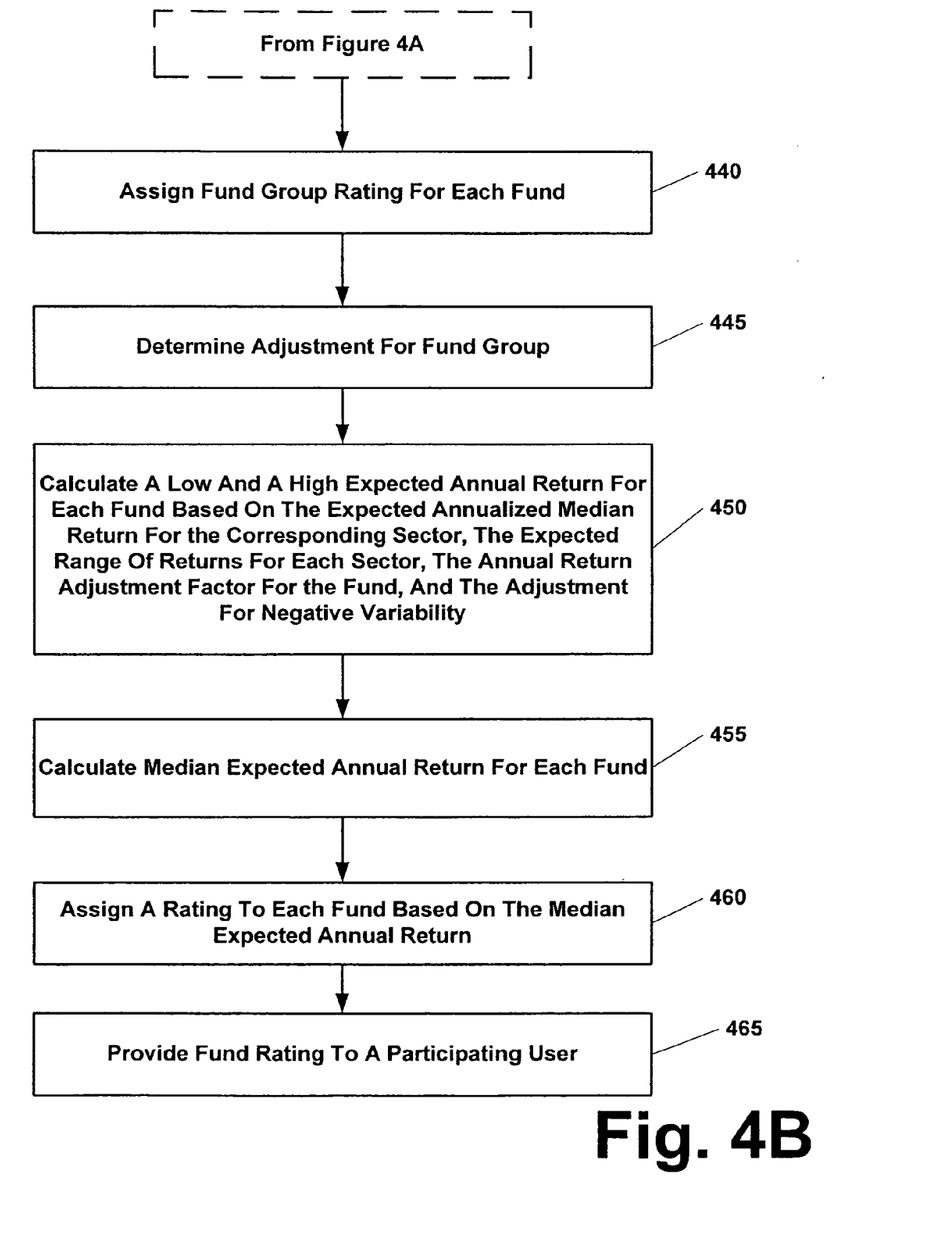

Referring now to FIGS. 4A and 4B, the method of the herein described system and methods will be described. The method may be carried out manually, but preferably is implemented in an exemplary computing environment (as described in FIG. 3). The exemplary computing environment may include a graphical user interface providing prompts for seeking input from a human operator. The exemplary computing environment may alternatively have access to one or more cooperating databases containing information about fund performance, option markets, and other information, and may be able to extract relevant information without the intervention of a human operator. Numerous variations and combinations of these general approaches are possible.

The process flow of the method for assigning a rating to a fund commences with the identification of a sector corresponding to the fund, as indicated by block 400. An example of a sector is U.S. large capitalization funds. Other sectors are U.S. small capitalization funds, and European large capitalization funds. It will be understood that any defined universe of securities that has a financial future associated therewith may be regarded as a sector. The step of identifying a sector would ordinarily be carried out manually. A program may prompt the user to select a sector from a menu of choices.

From there processing proceeds to block 405 where financial futures corresponding to the identified sector are identified. n example of futures for a sector is S&P 500 options and futures for U.S. large capitalization funds. This step may be carried out automatically by the software, using a table matching sectors to futures. Alternatively, the user may select the suitable financial futures and provide that information to the software as an input.

From there processing proceeds to block 410 where the expected median returns for the sector using the identified options and futures is calculated. In an illustrative operation, the expected median return is calculated fairly simply, by annualizing the percentage increase between the current value of the index and the futures price. Both the current value of the index and the futures price are readily available figures. For example, if the current price of the S&P 500 is 1264.74, and the price of options expiring in one year is 1328.8, then the expected median return is 5.06%. This result is obtained by simple division. Of course, options expiring at times other than one year may be employed for this step.

Processing then proceeds to block 415 where the expected range in future returns as implied by prices of options on the futures and a suitable option pricing model is calculated. The standard deviation in the return is calculated, based on known mathematical techniques. For example, the Black-Scholes technique is known to provide the necessary methodology. The necessary techniques are explained, for example, at pages 122-126 of Robert W. Kolb, Options: The Investor's Complete Toolkit (New York Institute of Finance 1991) which is herein incorporated by reference in its entirety. The inputs are the current price of the security, which in this case is the price of a basket of investments in the sector, such as the S&P 500, the current exercise price of the option, the risk-free interest rate, a current call price for the security, and the time until expiration of the option. The current exercise price, or strike price, is readily obtained from published sources. The risk-free interest rate is typically an interest rate for U.S. Treasury securities of a selected term. For example, 10-year U.S. Treasury securities may be employed. If desired, other low-risk securities may be employed. The current call price for the security is generally readily obtained from published sources. The time until the expiration of the options depends upon the day of the calculation.

By way of example, the inputs are used in the following equation for the Black-Scholes Option Pricing Model for a call option:

$$C=SN(d1)-Ee-nN(d2)$$

where C is the call option price, S is the price of the security, E is the current exercise price, n is the risk-free interest rate, and N( ) is a cumulative normal distribution function, that is, the probability that a normally distributed variable with a zero mean and a standard deviation of 1.0 will have a value equal to or less than the value.

$$\text{and } d1=(\ln(S/E)+(r+0.5\Phi 2)t)/\Phi ot$$

$$\text{and } d2=d1-\Phi ot$$

where t is time, ordinarily expressed in years, and $\Phi$ is the standard deviation of the fund's returns. The standard deviation can be obtained by iteratively selecting proposed standard deviations, until a satisfactory result is obtained. The standard deviation is preferably annualized, by multiplying a daily standard deviation by a factor equal to the square root of the time period, e.g., the square root of 250, based on a 250 trading day year.

As is shown in FIG. 4A, processing then proceeds to block 420 where the annualized return for each fund is calculated. The annualized return for each fund is calculated based on historical data of the value of each fund over a selected historical period. The historical period is ordinarily a period of years, but may be selected as desired.

Processing then proceeds to block 425 where an annual return adjustment factor for each fund is calculated. In an illustrative implementation, the annual return adjustment factor is the difference obtained by subtracting the calculated annualized return for the fund from the median return for the other funds, or for all of the funds, in the sector. It will be appreciated that this step requires calculation of the annual return for numerous funds in a single sector. From these annual returns, the median return is selected.

From there processing proceed to block 430 where the negative variability of returns factor for each fund is calculated. In an illustrative implementation, the negative variability is a percentage factor equal to the extent to which the fund's return are below the median for any given span of time, covering a selected number of selected periods. The fund's historical returns are compared for each selected period, such as quarterly or annually, to the median return, over a period, such as five years. For each period in which the fund's return was less than the median, the difference between the fund's return and the median is calculated. These differences are summed, and divided by the total number of periods. The result is assigned a negative value, which is the negative variability of returns. For example, if over a five-year period, a fund's returns were less than the median during ten quarters, the differences between the actual return and the median for each of those ten quarters is calculated. Those differences are summed, and divided by the total number of quarterly periods in the five-year span, i.e., by 20 in this example.

After the negative variability of returns for each fund under consideration in the sector is obtained, then the median negative variability of returns is calculated for all the funds in that sector.

Processing then proceeds to block 435 where an adjustment for negative variability of returns is calculated. In an illustrative implementation, this factor is the difference between the negative variability of returns for the fund and the median negative variability of return for funds in the corresponding sector. A positive result indicates that the negative variability of returns for the fund is less negative than the median. A negative adjustment for negative variability of returns indicates that the negative variability of returns for that fund is more negative than the median.

As shown in FIG. 4B processing generally continues. Specifically, processing proceeds from block 435 of FIG. 4A to block 440 as shown in FIG. 4B where the fund group rating is determined. In an illustrative implementation, the fund group rating may be on a scale of 1 to 5, and may include an assessment of fund management, efficiency, support, systems and other factors which are reflected in the rating of the fund group. The scale may have as many or as few gradations as desired. It will be understood that this is a qualitative factor; a computer program of the herein described system and methods may prompt the user for this value. It will also be understood that this step is optional. An adjustment is then selected such as from 80% to 110, for fund group and other qualitative factors, as indicated by block 445. The range of possible adjustment factors may be greater or less, as desired.

From there, process proceeds to block 450 where the expected annual returns for each fund is calculated. Illustratively, a low return is calculated for each fund. The low expected annual return is equal to the median annualized return for the sector, less the calculated expected range of returns for the sector, plus the fund's annual return adjustment factor, plus the adjustment for negative variability of returns. The method may adjust this by multiplying by a factor equal to the adjustment for fund group. A high expected annual return and a median expected annual return are both calculated for each fund, as indicated by block 455. The high expected annual return adds the expected range of returns. This may also be adjusted by the adjustment for fund group factor. A median of the high and low may be calculated, and a median of expected annual returns for all of the funds in the sector.

At block 460 the fund rating is assigned. Illustratively, a fund rating may be assigned based on the median expected annual return and the range from high to low of expected annual returns. A simple algorithm may be created to weight the return and the range. In such an algorithm, as the return increases, the rating increases, and as the range increases, the rating decreases. The rating may be a numerical value, such as from 1 to 6.

Processing then proceeds to block 465 where the fund rating is provided to a participating user. Illustratively, this step can be accomplished by including the rating in an electronic or printed report to an investor or a financial advisor, for example. The ratings are then employed by the investor or financial advisor in determining whether to make investments in that fund, or to continue to remain invested in that fund.

It is understood that the herein described systems and methods are susceptible to various modifications and alternative constructions. There is no intention to limit the herein described systems and methods to the specific constructions described herein. On the contrary, the herein described systems and methods are intended to cover all modifications, alternative constructions, and equivalents falling within the scope and spirit of the herein described systems and methods.

It should also be noted that the herein described systems and methods can be implemented in a variety of electronic environments (including both wired and wireless networked environments), partial computing environments, and other real world environments. The various techniques described herein may be implemented in hardware or software, or a combination of both. Preferably, the techniques are implemented in computing environments maintaining programmable computers that include a computer network, processor, servers, a storage medium readable by the processor (including volatile and non-volatile memory and/or storage elements), at least one input device, and at least one output device. Computing hardware logic cooperating with various instructions sets are applied to data to perform the functions described above and to generate output information. The output information is applied to one or more output devices. Programs used by the exemplary computing hardware may be preferably implemented in various programming languages, including high level procedural or object oriented programming language to communicate with a computer system. Illustratively the herein described apparatus and methods may be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The apparatus may also be considered to be implemented as a computer-readable storage medium, configured with a computer program, where the storage medium so configured causes a computer to operate in a specific and predefined manner.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. A method for assigning ratings to a fund, comprising the steps of:
    operating a server to calculate an expected return over a time period for a sector corresponding to the fund based on financial futures corresponding to the sector;
    operating the server to calculate an expected range of returns for the sector based on prices of options for the futures;
    operating the server to calculate an expected return for the fund over a time period based on the calculated expected return for the corresponding sector, and the expected range of returns for the corresponding sector; and
    operating the server, based on information specific to the fund, to assign a rating based on the expected return for the fund.

2. The method of claim 1, wherein said information specific to the fund includes an annual return adjustment factor equal to the difference between the annualized returns for the fund and a median return for other funds in the sector.

3. The method of claim 1, wherein said information specific to the fund includes a factor for the extent to which the fund's returns are below the median for that sector for a time period.

4. The method of claim 1, wherein, in the step of calculating expected annual returns for the fund, an adjustment for qualitative factors is made.

5. The method of claim 1, wherein said step of calculating an expected annual return comprises the steps of calculating a low, and a high expected annual return.

6. The method of claim 1, wherein said step of assigning a rating comprises assigning one of a plurality of ratings to each fund.

7. The method of claim 1 further comprising providing the rating to a participating user.

8. A method for predicting expected returns of a fund, comprising the steps of:
    operating a server to calculate an expected return over a time period for a sector corresponding to the fund based on financial futures corresponding to the sector;
    operating the server to calculate an expected range of returns for the sector based on prices of options for the futures; and
    operating the server to calculate an expected annual return for the fund based on the expected annualized return for the corresponding sector, the expected range of returns for the corresponding sector and on information specific to the fund.

9. The method of claim 8, wherein said information specific to the fund includes an annual return adjustment factor equal to the difference between the annualized returns for the fund and a median return for other funds in the sector.

10. The method of claim 8, wherein said information specific to the fund includes a factor for the extent to which the fund's returns are below the median for that sector for a time period.

11. The method of claim 8, wherein, in the step of calculating expected annual returns for the fund, an adjustment for qualitative factors is made.

12. The method of claim 8, wherein said step of calculating an expected annual return comprises the steps of calculating a low, and a high expected annual return.

13. A system for assigning ratings to a fund, comprising:
    means for calculating an expected return over a time period for a sector corresponding to the fund based on financial futures corresponding to the sector;
    means for calculating an expected range of returns for the sector based on prices of options for the futures;
    means for calculating an expected return for the fund over a time period based on the calculated expected return for the corresponding sector, the expected range of returns for the corresponding sector; and
    means for assigning a rating based on the expected return for the fund using information specific to the fund.

14. The system of claim 13, wherein said information specific to the fund includes an annual return adjustment factor equal to the difference between the annualized returns for the fund and a median return for other funds in the sector.

15. The system of claim 13, wherein said information specific to the fund includes a factor for the extent to which the fund's returns are below the median for that sector for a time period.

16. The system of claim 13, wherein said means for calculating expected annual returns for the fund comprises means for permitting a user to make an adjustment for qualitative factors.

17. The system of claim 13, wherein said means for calculating an expected annual return comprises means for calculating a low and a high expected annual return.

18. The system of claim 13, wherein said means for assigning a rating comprises means for assigning one of a plurality of ratings to each fund.

19. The system as recited in claim 13 further comprising a means for communicating the rating to a participating user.

20. A storage medium having stored therein a plurality of instructions, wherein the plurality of instructions, when executed by a processor, cause the processor to perform the steps of:
- calculating an expected return over a time period for a sector corresponding to a fund based on financial futures corresponding to the sector;
- calculating an expected range of returns for the sector based on prices of options for the fixtures;
- calculating an expected return for the fund over a time period based on the calculated expected return for the corresponding sector, the expected range of returns for the corresponding sector; and
- on information specific to the fund, assigning a rating based on the expected return for the fund.

21. The storage medium of claim 20, wherein said information specific to the fund includes an annual return adjustment factor equal to the difference between the annualized returns for the fund and a median return for other funds in the sector.

22. The storage medium of claim 20, wherein said information specific to the fund includes a factor for the extent to which the fund's returns are below the median for that sector for a time period.

23. The storage medium of claim 20, wherein in the step of calculating expected annual returns for the fund, an adjustment for qualitative factors is made.

24. The storage medium of claim 20, wherein said step of calculating an expected annual return comprises the steps of calculating a low, and a high expected annual return.

25. The storage medium of claim 20, further comprising providing the rating to a participating user.

26. The method of claim 8, wherein the expected return over the time period is an expected median return.

27. The method of claim 7, wherein:
- the sector is one of U.S. large capitalization funds, U.S. small capitalization funds and European large capitalization funds;
- the expected return over a time period for the sector is calculated based on an annualization of a current value of an index for the sector and a futures price for the sector;
- the expected range of returns for the sector is calculated based on the prices of options for the futures and a option pricing model which is based on a current exercise prices of the options, a risk-free interest rate, current call prices for the options, and times until expirations of the options; and
- the information specific to the fund is a negative variability which is a percentage factor equal to an extent to which returns for the fund are below a median return for a period of time.

28. The method of claim 27, wherein the period of time for determining the negative variability is divided into selected periods, and a difference between the returns for the fund and the median return are calculated for each period.

* * * * *